(12) United States Patent
Nemoto et al.

(10) Patent No.: US 7,944,338 B2
(45) Date of Patent: May 17, 2011

(54) RFID TAG, RFID READER/WRITER, RFID SYSTEM, AND PROCESSING METHOD OF RFID SYSTEM

(75) Inventors: Ryo Nemoto, Kokubunji (JP); Hiroshi Yoshigi, Hinode (JP); Yoshiaki Yazawa, Nishitokyo (JP); Kazuki Watanabe, Hino (JP)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 11/491,990

(22) Filed: Jul. 25, 2006

(65) Prior Publication Data

US 2007/0176772 A1 Aug. 2, 2007

(30) Foreign Application Priority Data

Oct. 19, 2005 (JP) ................... 2005-304073

(51) Int. Cl.
*G08B 1/08* (2006.01)
*G08B 13/14* (2006.01)
*H04Q 5/22* (2006.01)

(52) U.S. Cl. ............ 340/10.34; 340/539.22; 340/539.27; 340/572.1; 340/10.1

(58) Field of Classification Search .................. None
See application file for complete search history.

(56) References Cited

U.S. PATENT DOCUMENTS

| | | | | |
|---|---|---|---|---|
| 5,999,091 A | * | 12/1999 | Wortham | 340/431 |
| 7,200,361 B2 | * | 4/2007 | Onodera | 455/41.1 |
| 7,218,641 B2 | * | 5/2007 | Kuffner et al. | 370/445 |
| 7,510,110 B2 | * | 3/2009 | Pietrzyk et al. | 235/375 |
| 7,636,031 B2 | * | 12/2009 | Mirmobin et al. | 340/10.1 |
| 2002/0126005 A1 | * | 9/2002 | Hardman et al. | 340/442 |
| 2004/0233043 A1 | * | 11/2004 | Yazawa et al. | 340/10.3 |
| 2005/0204825 A1 | | 9/2005 | Kunerth et al. | |
| 2005/0252979 A1 | * | 11/2005 | Konuma et al. | 235/492 |
| 2006/0244568 A1 | * | 11/2006 | Tong et al. | 340/10.41 |
| 2006/0267731 A1 | * | 11/2006 | Chen | 340/10.1 |
| 2007/0001848 A1 | * | 1/2007 | Shanks | 340/572.1 |
| 2007/0205916 A1 | * | 9/2007 | Blom et al. | 340/870.17 |

FOREIGN PATENT DOCUMENTS

| | | |
|---|---|---|
| EP | 0 841 579 | 5/1998 |
| JP | 2004-348496 | 12/2004 |
| JP | 2005-032256 | 2/2005 |
| JP | 2005-77210 | 3/2005 |
| JP | 2005-115408 | 4/2005 |
| WO | WO 03/081802 | 10/2003 |

* cited by examiner

*Primary Examiner* — Davetta W Goins
*Assistant Examiner* — Fekadeselassie Girma
(74) *Attorney, Agent, or Firm* — Antonelli, Terry, Stout & Kraus, LLP.

(57) ABSTRACT

In an RFID system including RFID tags each incorporating a sensor, accuracy of measurement by the sensor can be improved. For example, when measurements are performed several times by using RFID tags each incorporating a sensor unit, generation of a carrier directed from an RFID reader/writer to the RFID tags is stopped for a predetermined period every time when a measurement ends. By this means, the chip temperature of the RFID tag increased due to power consumption in each measurement can be reduced to, for example, ambient temperature every time when a measurement ends. Therefore, an error in measurement by the sensor unit can be reduced, thereby achieving accurate measurement.

2 Claims, 19 Drawing Sheets

FIG. 10

| COMMAND | | CODE | | | OPERATION DESCRIPTION |
|---|---|---|---|---|---|
| UNIFIED IDENTIFICATION INFORMATION REQUEST COMMAND (Req_UID) | | C01 | C02 | | REQUEST TRANSPONDER ID |
| PREPROCESSING EXECUTION COMMAND | PREPROCESSING EXECUTION COMMAND FOR TEMPERATURE SENSOR (Set_Th) | C04 | C03 | C05 | C06 | MAKE TEMPERATURE SENSOR PERFORM PREPROCESSING (SETTING OF PARAMETERS AT THE TIME OF MEASUREMENT OR OTHERS). IN THE CASE OF PARAMETER SETTING, WRITE IN MEMORY. |
| MEASUREMENT EXECUTION COMMAND | MEASUREMENT COMMAND FOR TEMPERATURE SENSOR (Meas_Th) | C07 | C03 | C05 | MAKE TEMPERATURE SENSOR MEASURE |
| MEASUREMENT RESULT REQUEST COMMAND(Req_Result) | | C08 | C09 | | REQUEST MEASUREMENT RESULTS |

| COMMAND | CODE | DETAILS |
|---|---|---|
| Res_UID | C23 | UPON MATCHING WITH CHECK SLOT, RETURN UID INFORMATION |
| Res_Compl | C21 | RETURN FLAG INDICATIVE OF COMPLETION OF PREPROCESSING AND RECEPTION OF MEASUREMENT COMMAND |
| Res_Result | C22 | RETURN MEASUREMENT DATA |

RFID TAG, RFID READER/WRITER, RFID SYSTEM, AND PROCESSING METHOD OF RFID SYSTEM

CROSS-REFERENCE TO RELATED APPLICATION

The present application claims priority from Japanese Patent Application No. JP 2005-304073 filed on Oct. 19, 2005, the content of which is hereby incorporated by reference into this application.

TECHNICAL FIELD OF THE INVENTION

The present invention relates to a technology particularly effective when applied to a measurement system using RFID tags each incorporating a sensor, in which a plurality of functions such as a sensor, a signal processing, and a logic control circuit are integrated on one chip.

BACKGROUND OF THE INVENTION

For example, Japanese Patent Laid-Open Publication No. 2004-348496 (Patent Document 1) discloses a technology in which, in a communications system composed of transponders each including a sensor, an authentication number, and a wireless transmission/reception function and a reader/writer, when the sensing results obtained by the transponders are transferred to the reader/writer, the communication frequency and transmission output on the reader/writer side can be varied. By this means, manufacturing variations of transponders and variations in resonance frequency depending on the surrounding environment can be absorbed, thereby improving the communication stability.

Japanese Patent Laid-Open Publication No. 2005-32256 (Patent Document 2) discloses a configuration in which IC tag-sensor units are mounted on many target components and devices such as shaft bearings of a belt conveyer in a thermal power station, for example. Japanese Patent Laid-Open Publication No. 2005-115408 (Patent Document 3) discloses a technology in which passive wireless tags are used as a means for detecting abnormal circumstances such as fire, earthquake, water leakage, and traffic accidents.

SUMMARY OF THE INVENTION

In recent years, as disclosed in the above-described patent documents 1 to 3 by way of example, a technology of reading the measurement results of sensors through wireless communication from RFID tags incorporating the sensors has attracted attention.

FIG. 1 is a schematic drawing of an example of structure of a measurement system using RFID tags. The measurement system of FIG. 1 has an exemplary structure based on, for example, the communication system disclosed in the above-described patent document 1. This system uses RFID tags each incorporating a sensor for inspecting various measurement items regarding biometric information. Each RFID tag incorporates one type of sensor for measuring the temperature, light, ion concentration, distortion, pressure, or others of a detection target.

FIG. 1 depicts RFID tags TR1 to TR3 as described above, a reader/writer R/W for communication with the RFID tags, and a host device SYS_CTL for controlling R/W and managing the measurement results. In this case, TR1 to TR3 are placed in a solution 101 contained in a chamber 100, for example. As the host device SYS_CTL, a PC (Personal Computer) or the like is used. For the communication between R/W and the RFID tags, a carrier 105 is outputted from a reader/writer antenna ATN_R.

FIG. 2 is a block diagram of an example of structure of an RFID tag shown in FIG. 1. An RFID tag TRa of FIG. 2 includes an antenna ATN_T, a communication processing unit RF1, a power generating unit PWS, a control unit TR_CTL1, an RFID-tag identifier UID, a sensor unit SENS, and a signal processing unit SP. The communication processing unit RF1 includes functions of modulation, demodulation, and others and performs the wireless communication via the antenna ATN_T. The power generating unit PWS generates a power supply voltage by using the carrier outputted from R/W. The signal processing unit SP performs, for example, processing on the measurement results obtained by the sensor unit SENS. The controlling unit TR_CTL1 controls the overall operation of the RFID tag TRa. FIG. 3 is a block diagram of another example of structure of the RFID tag shown in FIG. 1. An RFID tag TRb of FIG. 3 is an example of structure of an RFID tag with a direct-current power supply. This tag incorporates a direct-current power supply BAT in place of the power generating unit PWS of FIG. 2.

FIG. 19 is a sequence diagram of an example of a measurement procedure using the measurement system in FIG. 1 in an RFID system studied prior to the present invention. PC corresponds to the host device SYS_CTL for controlling the operation of R/W, Chip corresponds to the RFID tag TR, and SENS corresponds to a sensor unit in Chip, respectively. In FIG. 19, measurements are performed several times by using the sensor unit SENS. FIG. 20 is a sequence diagram showing one measurement in FIG. 19 in detail.

As shown in FIG. 20, in the flow of measurement, the reader/writer R/W first transmits a command for acquiring an identifier of the RFID tag in step 307. Next, in step 308, the reader/writer R/W transmits a command for setting parameters required for the measurement. In the next step 309, a command for performing the measurement is transmitted, and upon this command, a response indicative of command reception is returned from the RFID tag. In step 310, R/W is in a state of waiting until the RFID tag completes the measurement. In step 311, R/W transmits to the RFID tag a command to return the measurement results. In step 312, the measurement data received by R/W is stored by the host device.

In the measurement system as described above, measurement is repeatedly performed in general as shown in FIG. 19 in order to ensure accuracy and observe changes with time in the detection results through the permanent measurement. Consequently, while the RFID tag is in operation, an increase in temperature inside the RFID tag (self-heating) occurs due to the consumed power, which causes an error at the time of measurement. In particular, such an increase in temperature occurs easily because the area of the RFID tag is small. The trouble due to such an increase in temperature is not limited to a temperature sensor, but it also affects various types of sensors. For example, an erroneous detection occurs in an optical detection sensor due to a dark current, and a measurement error occurs in an ion concentration sensor due to thermal noise of a MOS transistor.

The present invention has been devised in view of the above, and objects and novel features of the present invention will be apparent from the description in the specification and the attached drawings.

The typical ones of the inventions disclosed in this application will be briefly described as follows.

The RFID system according to the present invention includes RFID tags each incorporating a sensor circuit and an RFID reader/writer, and further, it has a function to cut off the power supply to all or part of circuits in the RFID tags for a predetermined period during each interval between the measurements, when measurements are successively performed several times by using the sensor circuits. By this means, the temperature of the RFID tag increased by self heating due to the power supply can be returned to approximately ambient temperature, and each measurement can be performed in this state. Therefore, a measurement error can be reduced, and highly-accurate measurement can be achieved.

Such a function to cut off the power supply can be readily achieved by, for example, cutting off a carrier signal from the RFID reader/writer to the RFID tag. This function can also be achieved by providing a power cutoff circuit to the RFID tag.

Furthermore, a sequence in each of the measurements using a sensor circuit includes, for example, a first processing step of checking an identifier, setting measurement conditions, and others and a second processing step of performing an actual measurement and processing the measurement results. In such a case, the above-described period in which the power is cut off can be assumed to be, for example, a period from the end of the second processing step to the start of the first processing step. By doing so, the temperature once increased can be cooled down for each measurement sequence. Still further, if further accurate measurement is desired to perform, it is also effective to cut off the power supply between the first processing step and the second processing step. By doing so, the temperature increased during the first processing step can be cooled down.

Still further, in the RFID system according to the present invention, in the above-described sequence in each measurement, measurements and processing on the measurement results are performed several times in the second processing step. Then, an error due to self heating is corrected based on each measurement result to calculate one measurement result for the second processing step. Also by this means, high-accurate measurement can be achieved.

The effects obtained by typical aspects of the present invention will be briefly described below. That is, in the RFID system including RFID tags each incorporating a sensor, accuracy of measurement by the sensor can be improved.

BRIEF DESCRIPTIONS OF THE DRAWINGS

FIG. 10 is a drawing depicting an example of commands and codes to be transmitted by the reader/writer to the RFID tag and description of their operation in the RFID system according to the first embodiment of the present invention;

FIG. 11 is a drawing for describing an example of responses to be issued from the RFID tag to the reader/writer in the RFID system according to the first embodiment of the present invention;

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted.

First Embodiment

Figure 1:
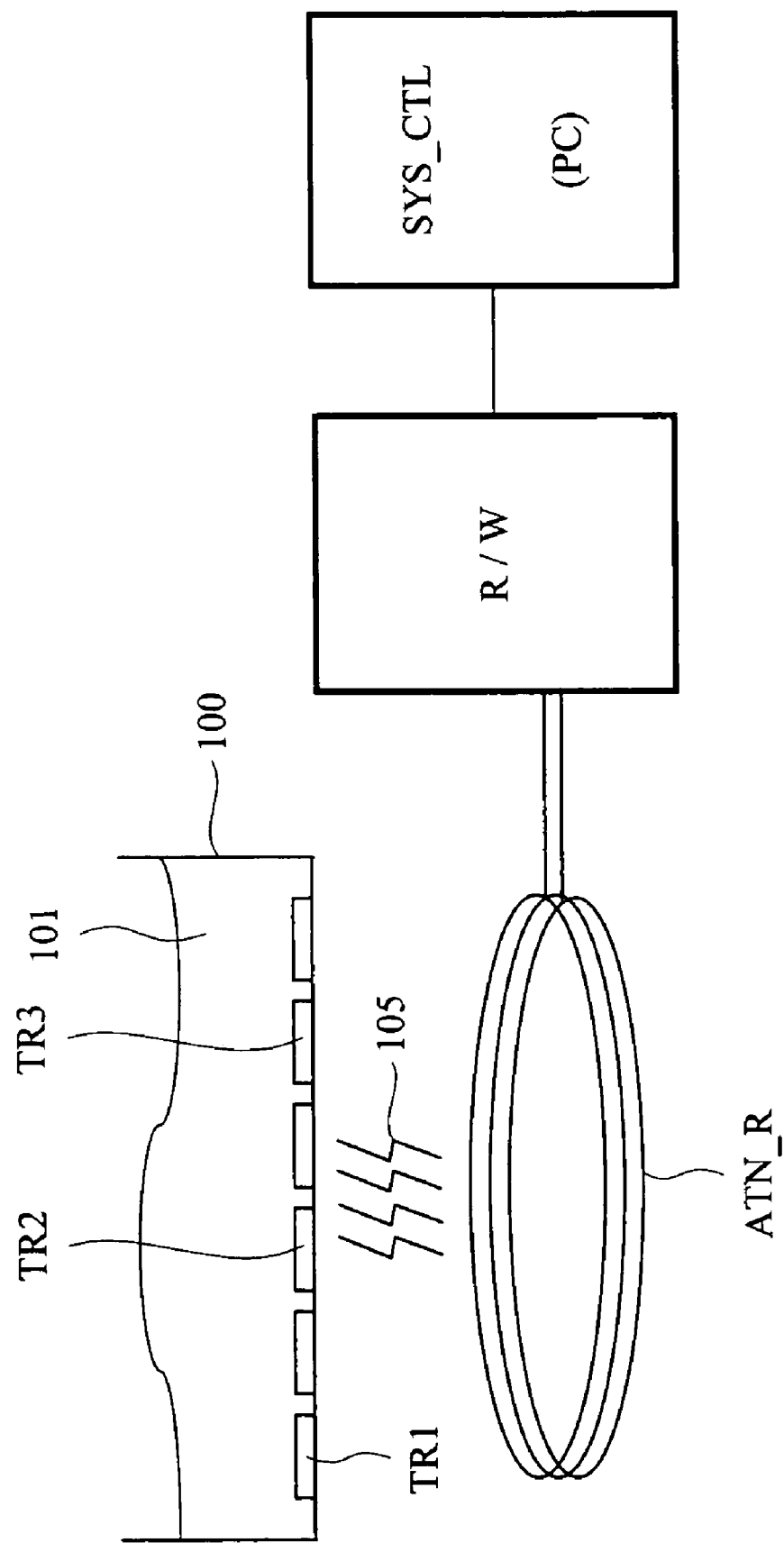
FIG. 1 is a schematic drawing of an example of structure of a measurement system using RFID tags.
Figure 2:
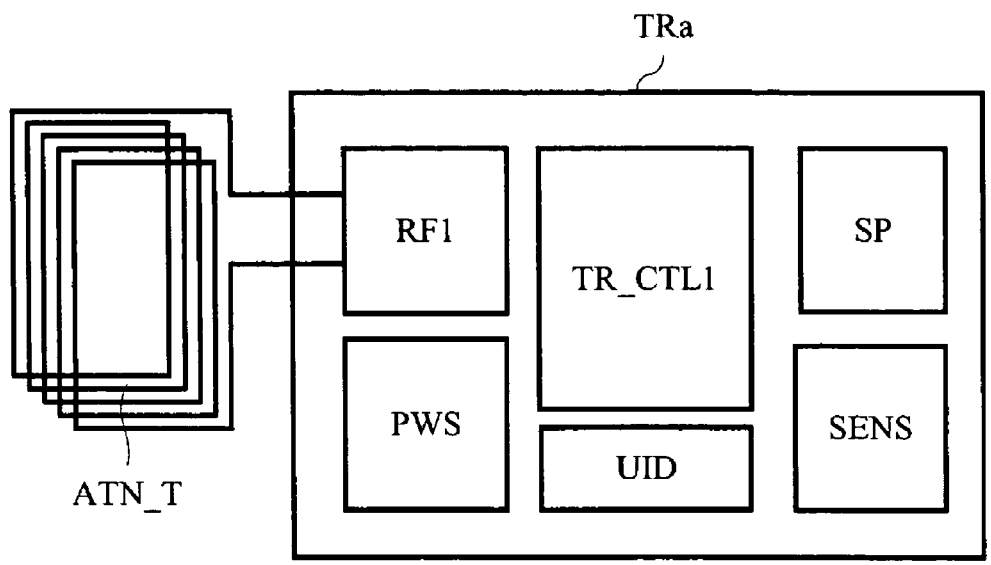
FIG. 2 is a block diagram of an example of structure of an RFID tag shown in FIG. 1.

An RFID system according to a first embodiment is applied to, for example, the measurement system shown in FIG. 1 and a passive RFID tag shown in FIG. 2. In the description here, the sensor unit SENS in each of the RFID tags TR1 to TR3 shown in FIG. 1 and FIG. 2 is assumed to be a temperature sensor (Th sensor). In this case, in the measurement system of FIG. 1, the temperature of the solution 101 is measured by the RFID tags TR1 to TR3, and the measurement data is then read by the reader/writer R/W. Also, a host device (upper-level system control device) SYS_CTL such as PC controls R/W and also processes the measurement data acquired from the RFID tags via R/W to determine the measurement results and others.

Figure 4:
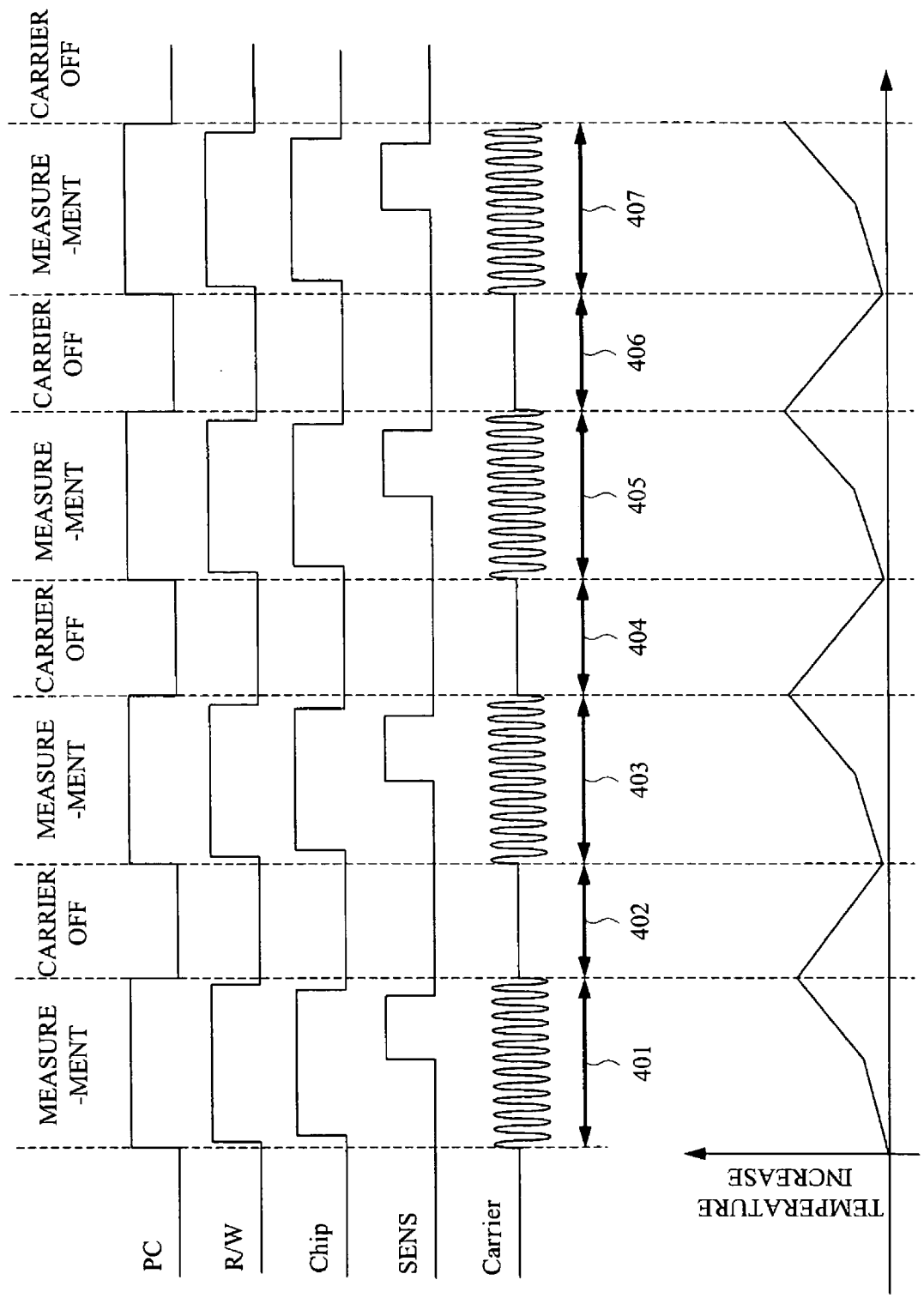
FIG. 4 is a sequence diagram of an example of a measurement procedure using the measurement system of FIG. 1 in an RFID system according to a first embodiment of the present invention.
Figure 19:
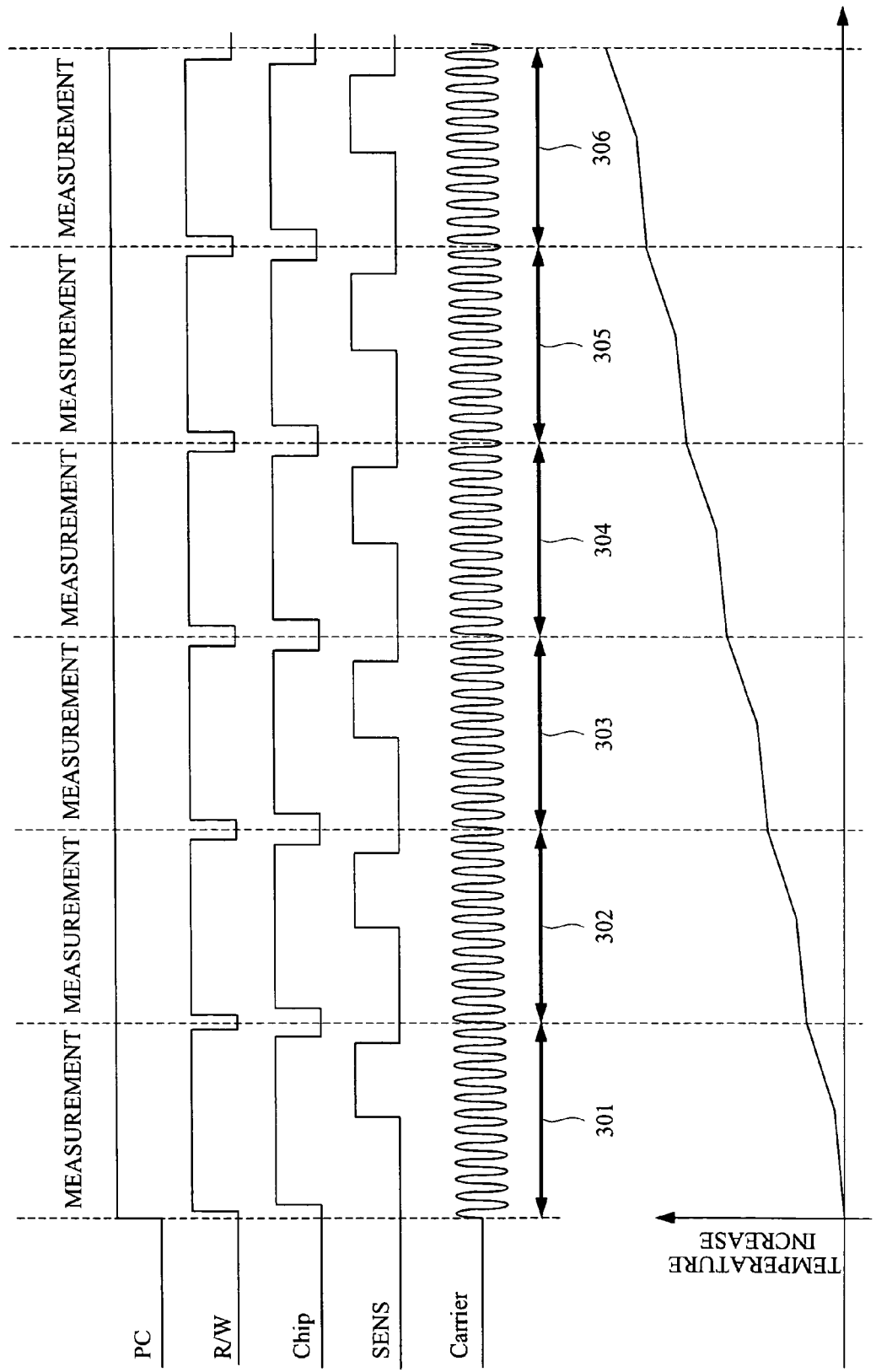
FIG. 19 is a sequence diagram of an example of a measurement procedure using the measurement system in FIG. 1 in an RFID system studied prior to the present invention.

FIG. 4 is a sequence diagram of an example of a measurement procedure using the measurement system of FIG. 1 in the RFID system according to the first embodiment of the present invention. In the sequence of FIG. 4, in each of the steps 401, 403, 405, and 407 for measurement, measurement is performed in accordance with the detailed sequence of FIG. 20 in a manner similar to that of FIG. 19 described above. However, in FIG. 19, R/W executes step 307 for requesting an identifier immediately after step 312 for storing data shown in FIG. 20. Meanwhile, in FIG. 4, R/W stops the output of a carrier for a predetermined period every time when step 312 for storing data shown in FIG. 20 ends, as shown by steps 402, 404, and 406.

Figure 18:
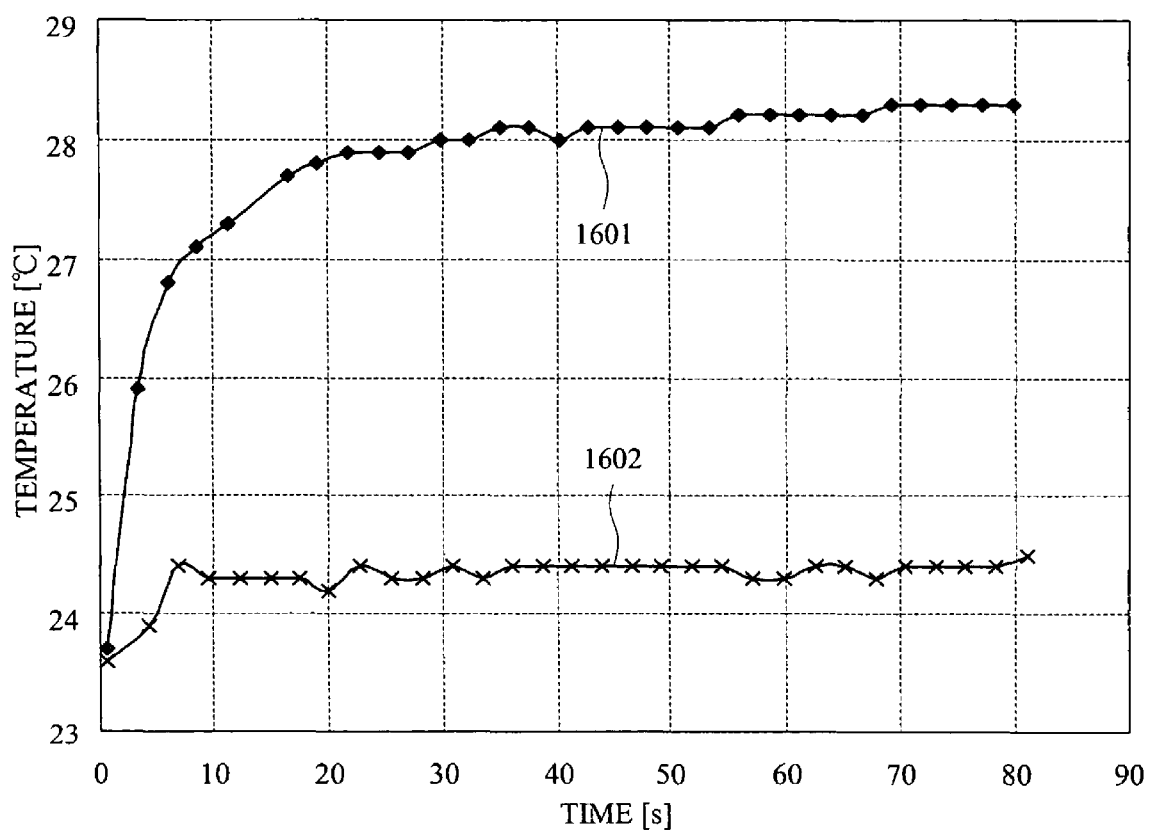
FIG. 18 is a drawing for describing an example of effects by the sequence shown in FIG. 4 in the RFID system according to the first embodiment of the present invention.

An effect of this measurement method is shown in FIG. 18. In this case, a period in which an output of the carrier is stopped in FIG. 4 is two seconds. As is apparent from the comparison between a temperature 1601 of the RFID tag before the carrier is stopped and a temperature 1602 thereof after the carrier is cut off, the temperature is increased by 5° C. or higher in a state where the carrier is always outputted, and an increase in temperature can be suppressed to 1° C. or lower by stopping the output of the carrier.

Next, an example of detailed structure of the measurement system of FIG. 1 and a detailed procedure to achieve the above-described measurement method will be described.

Figure 7:
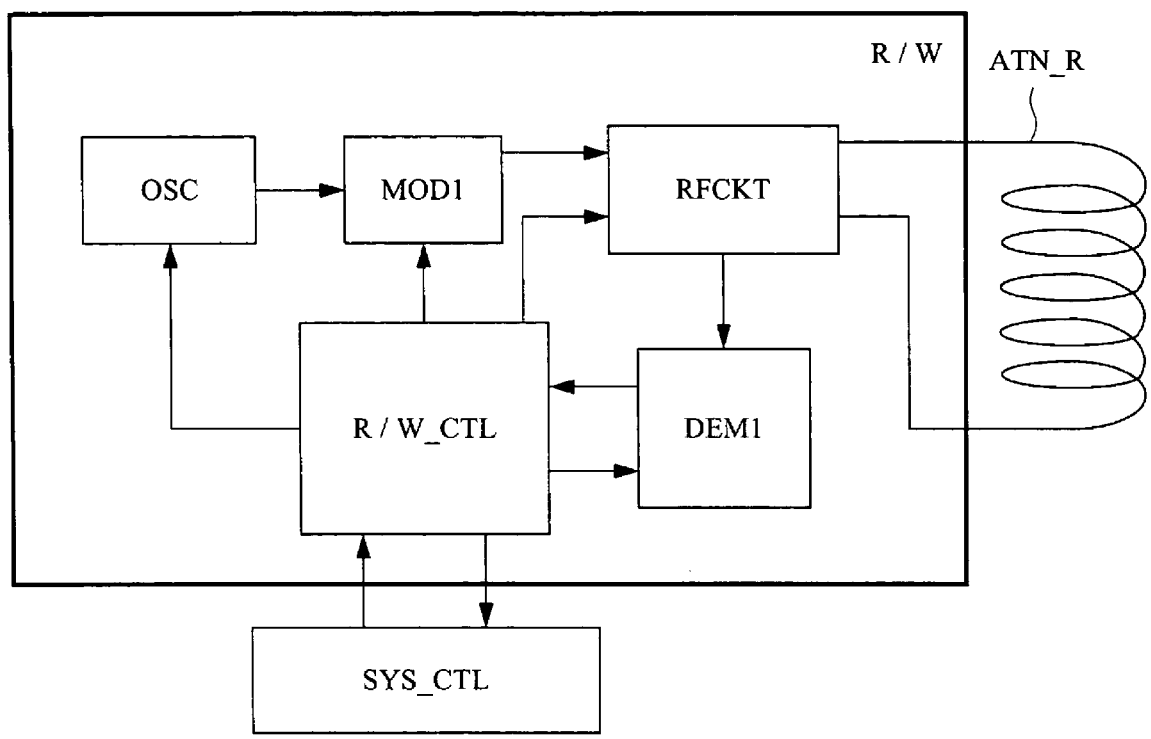
FIG. 7 is a block diagram of an example of structure of a reader/writer in the RFID system according to the first embodiment of the present invention.

FIG. 7 is a block diagram of an example of structure of a reader/writer in the RFID system according to the first embodiment of the present invention. The reader/writer R/W of FIG. 7 includes, for example, a coil antenna ATN_R for performing communication with RFID tags, a wireless communication circuit RFCKT connected to ATN_R, an oscillator OSC, a modulator circuit MOD1, a demodulator circuit DEM1, and a control circuit R/W_CTL. An oscillation frequency of the oscillator OSC is controlled by the control circuit R/W_CTL. The modulator circuit MOD1 modulates a signal desired to be transmitted to the RFID tag with the oscillation frequency generated at OSC, and then outputs the modulated signal to the wireless communication circuit RFCKT. The demodulator circuit DEM1 demodulates the signal transmitted from the RFID tag and received by RFCKT via ANT_R. Also, the control circuit R/W_CTL controls the modulation frequency of MOD1 and an RF frequency of RFCKT based on a control signal from the upper-level system control device SYS_CTL outside R/W.

Figure 8:
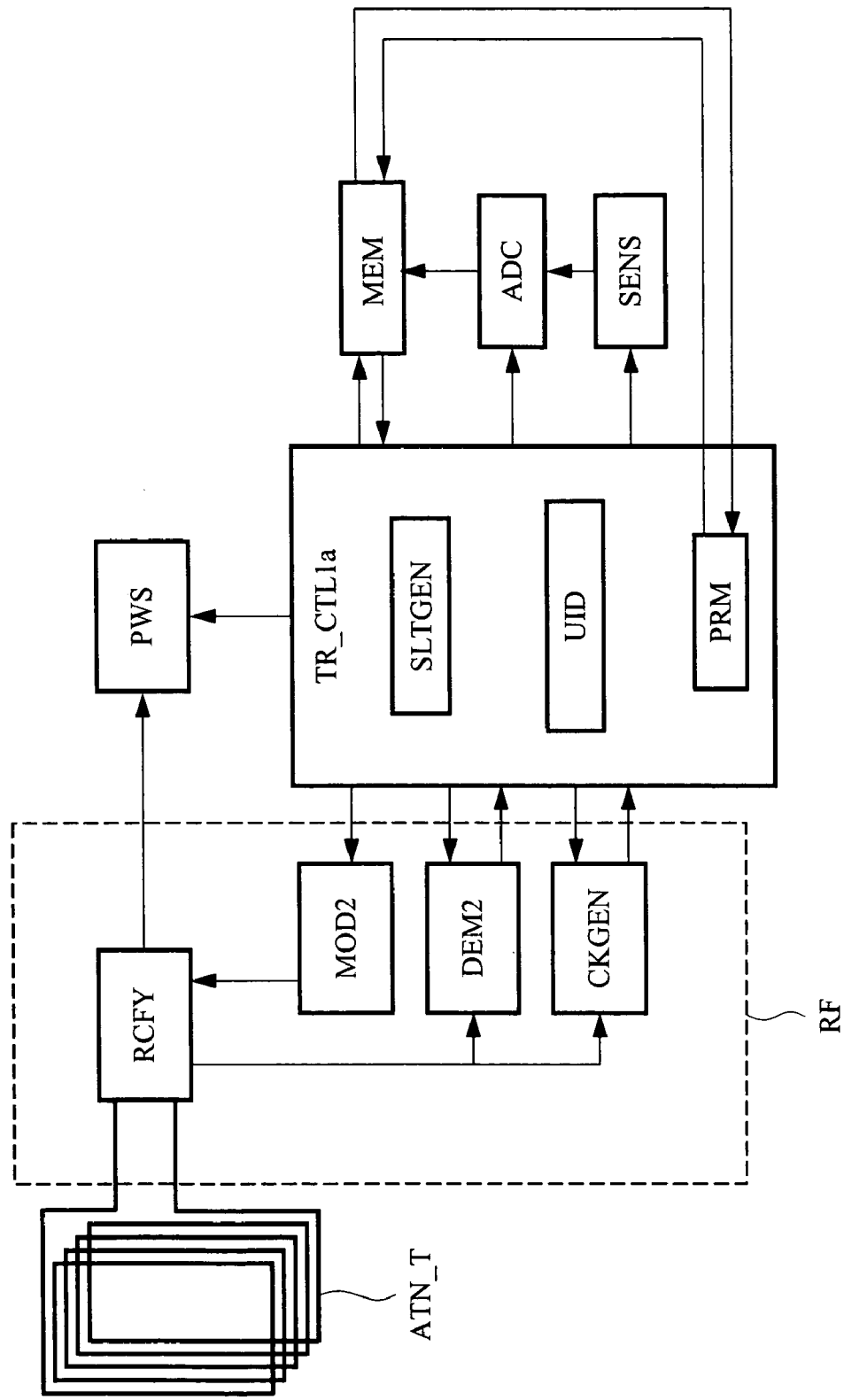
FIG. 8 is a block diagram of an example of structure of an RFID tag in the RFID system according to the first embodiment of the present invention.

FIG. 8 is a block diagram of an example of structure of an RFID tag in the RFID system according to the first embodiment of the present invention. An electromagnetic wave transmitted from the reader/writer R/W is received at a coil antenna ATN_T, is rectified by a rectifier circuit RCFY, and is then stabilized by a power generating unit PWS. This stabilized power is supplied as power of an RFID tag TRa1 to each circuit in TRa1 (note that, power supply lines are omitted in FIG. 8).

Also, the electromagnetic wave received at the coil antenna ATN_T is fed to a demodulator circuit DEM2 and a clock generator circuit CKGEN, in which the demodulation of respective signals and the generation of a clock signal for the inside of the RFID tag are performed. The modulator circuit MOD2 modulates various commands and data sent from a control unit TR_CTL1a via ATN_T. RCFY, DEM2, CLKGEN, and MOD2 form a communication processing unit RF for performing the communication with the reader/writer R/W.

A sensor unit SENS measures the temperature in the chamber. Analog data representing the measurement results detected by SENS is converted at an analog-to-digital converter circuit ADC to digital data, and is then stored in a memory circuit MEM. The control unit TR_CTL1a controls the modulator circuit MOD2, the demodulator circuit DEM2, the clock generator circuit CLKGEN, the sensor unit SENS, the analog-to-digital converter circuit ADC, and the memory circuit MEM. TR_CTL1a includes parameters PRM (values for determining a measurement range and sensitivity in the case of a temperature sensor) for controlling the operation of these circuits. Furthermore, TR_CTL1a includes a slot generating unit SLTGEN for preventing a collision in ID authentication at the time of communication with R/W and unified identification information (identifier) UID unique to the respective RFID tags.

FIG. 10 is a drawing depicting an example of commands and codes to be transmitted by the reader/writer to the RFID tags and description of their operation in the RFID system according to the first embodiment of the present invention. A unified identification information request command (Req_UID) is represented by codes C01 and C02 and requests an identifier UID of the RFID tag before the measurement. The code C01 represents a check slot, and the code C02 has a function to generate a slot in the RFID tag and transmit UID to the reader/writer R/W when the slot generated in the RFID tag matches the check slot C01. C01 is changed at predetermined intervals (for example, 000, 001, 010, . . . ), and its interval and cycle are controlled on the side of the R/W. Upon reception of C02, the RFID tag generates a slot by using a part of UID as an element for generating the slot (for example, a part of UID is directly used as a check slot).

Here, which portion of UID is to be used is controlled on the side of the R/W. If a return signal from the RFID tag comes into collision with Req_UID transmitted from R/W to the RFID tag, R/W transmits Req_UID once again after one cycle elapses. In this case, a part of UID for use in generating a slot is different from the previous one (for example, when S1, S2, and S3 are used in a first cycle, C02 is controlled so that S4, S5, and S6 are used in the next cycle). When the slots have matched, a response is returned from the RFID tag to R/W.

A temperature sensor preprocessing execution command (Set_Th) is formed of codes C04, C03, C05, and C06. The code C04 represents a preprocessing operation code of the temperature sensor and is used for the pre-measurement processing and parameter setting. The code C03 represents an ID of the RFID tag included in UID. C05 represents an ID including sensor information required for R/W to recognize that the temperature sensor is incorporated in the RFID tag. C06 represents a parameter for the temperature sensor.

A temperature sensor measurement execution command (Meas_Th) is formed of a code C07 and the above-described codes C03 and C05. The code C07 represents an operation code corresponding to a measurement start instruction for the temperature sensor. The measurement result request command (Req_Result) is formed of codes C08 and C09 and is a command for requesting transmission of the measurement results to each RFID tag. The code C08 is an instruction of transmitting the measurement results stored in the memory circuit MEM, and the code C09 represents UID.

FIG. 11 is a drawing for describing an example of responses to be issued from the RFID tag to the reader/writer in the RFID system according to the first embodiment of the present invention. An identification information response command (Res_UID) is formed of a code C23 and is generated when the check slot matches Req_UID from R/W. A preprocessing operation complete command (Res_compl) is formed of a code C21 and is generated upon completion of a preprocessing operation required before measurement such as setting of parameters of the temperature sensor. A measurement result return command (Res_Result) is formed of a code C22 and is generated when returning measurement data in response to Req_Result from R/W.

Figure 20:
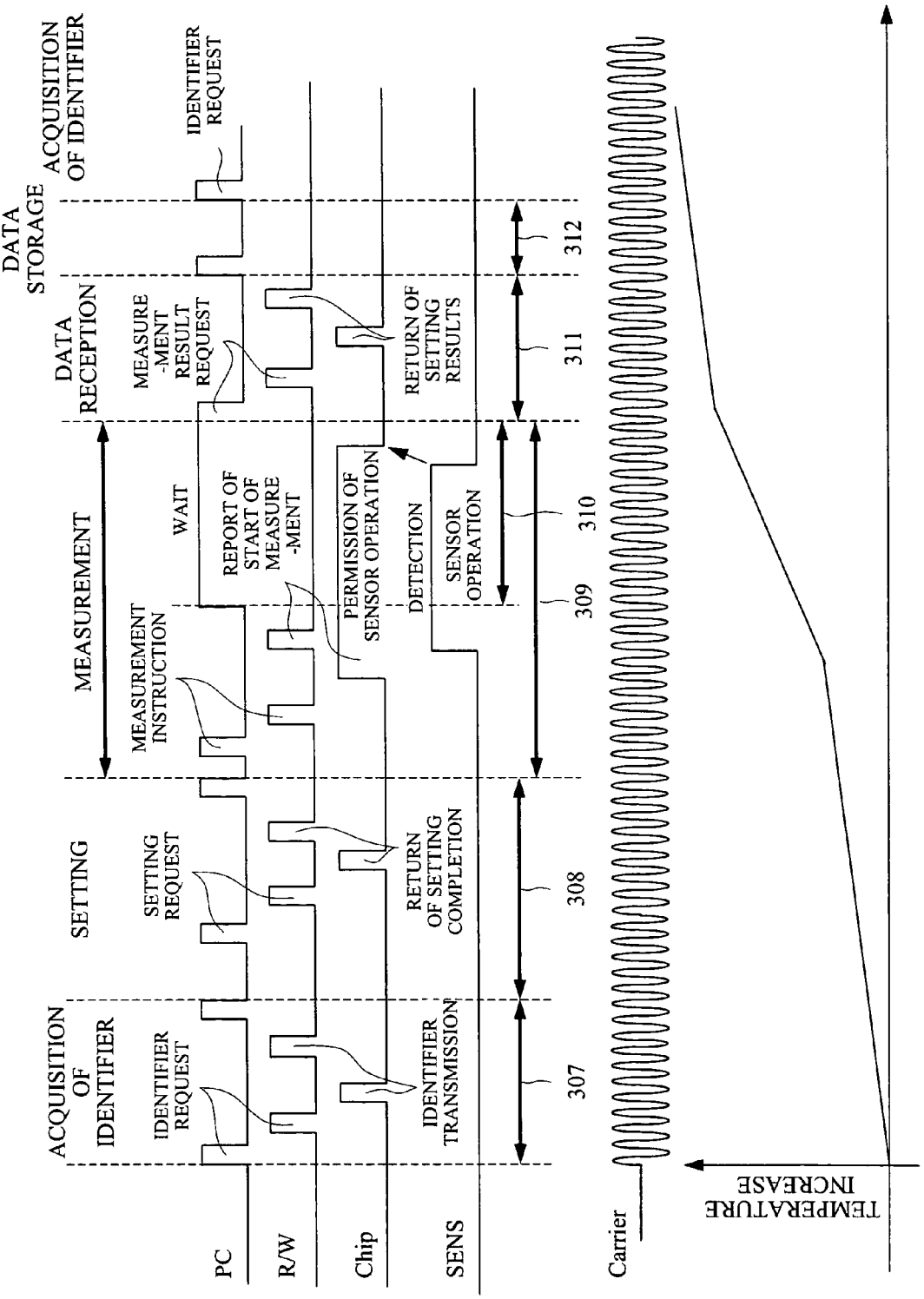
FIG. 20 is a sequence diagram showing one measurement in FIG. 19 in detail.

As described above, various commands as shown in FIG. 10 and FIG. 11 are used as appropriate in the sequence of FIG. 20. More specifically, while transmission and reception of commands as shown in FIG. 10 and FIG. 11 are performed with using R/W and the RFID tag as shown in FIG. 7 and FIG. 8, the sequence in which the carrier from R/W is temporarily stopped at each end of measurement is performed as shown in FIG. 4 and FIG. 20. By doing so, the measurement can be performed while suppressing an increase in temperature of the RFID tag. Therefore, in the RFID system including RFID tags each incorporating a sensor, accuracy of measurement by the sensor can be improved.

Second Embodiment

An RFID system according to a second embodiment is achieved by using a hardware structure similar to that of the above-described first embodiment. However, the processing sequence according to the second embodiment is different from that of the first embodiment.

Figure 5:
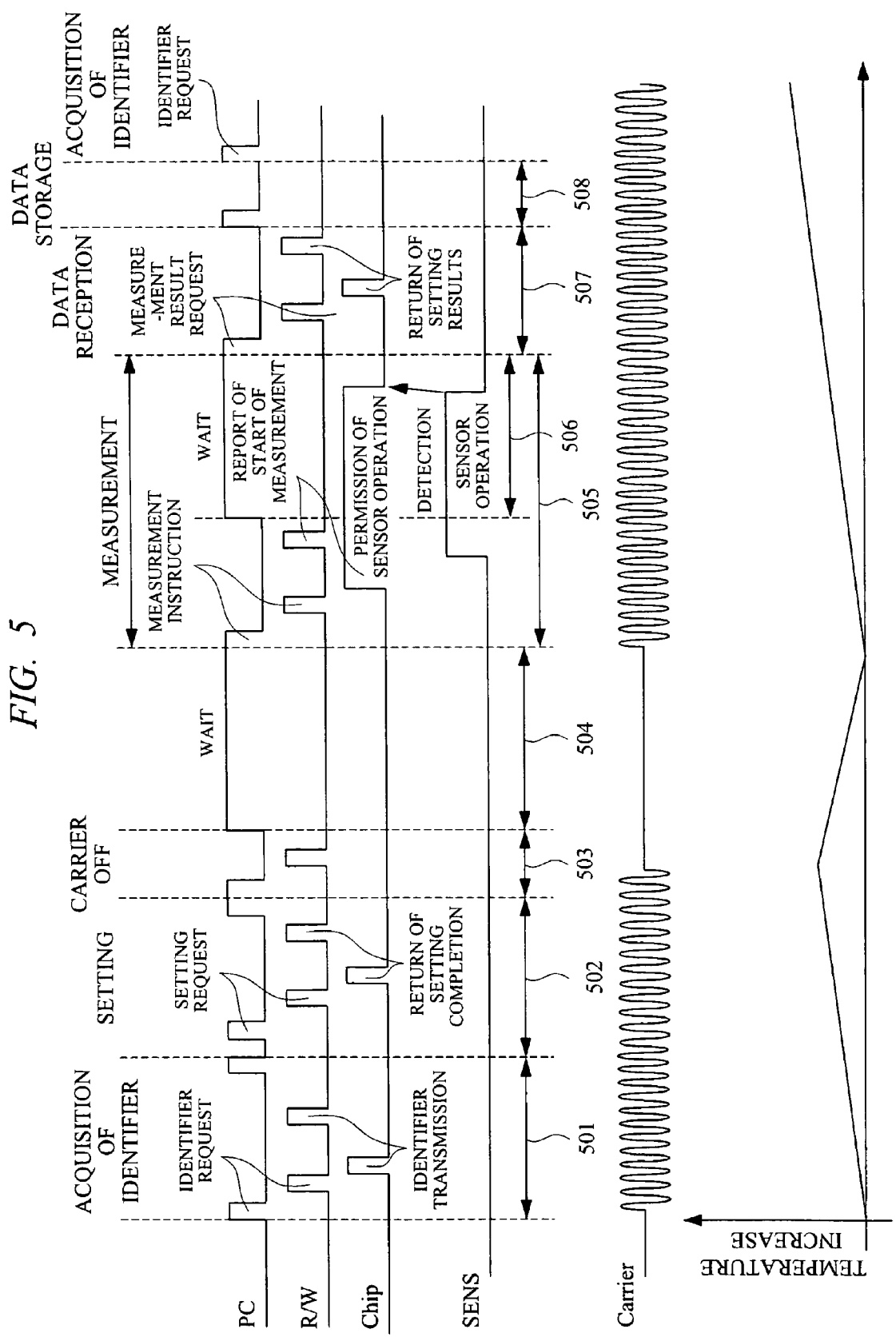
FIG. 5 is a sequence diagram of an example of a measurement procedure using the measurement system of FIG. 1 in an RFID system according to a second embodiment of the present invention.

FIG. 5 is a sequence diagram of an example of a measurement procedure using the measurement system of FIG. 1 in the RFID system according to the second embodiment of the present invention. The sequence shown in FIG. 5 is applied as a detailed sequence of each measurement in the sequence of FIG. 19 or each measurement in the sequence of FIG. 4. As shown in FIG. 5, step 501 of acquiring an identifier, step 502 of setting parameters, step 505 for measurement operation by the sensor unit SENS, step 507 of transmitting and receiving the measurement results, and step 508 of storing the measurement results are performed in this order between the reader/writer R/W and the RFID tag (Chip) in each measurement.

Note that the feature of the second embodiment lies in that steps (periods) 503 and 504 in which the carrier from R/W is stopped and R/W is in a waiting state for a predetermined period are provided between step 502 of setting parameters and step 505 for measurement operation. By this means, a slight increase in temperature occurring between steps 501 and 502 can be compensated, which makes it possible to perform more accurate temperature measurement compared with the first embodiment. Note that whether the sequence of FIG. 5 is used as a part of the sequence of FIG. 19 or a part of the sequence of FIG. 4 can be determined as appropriate based on a time interval between measurements in FIG. 4 or the length of the wait periods 503 and 504.

Figure 12:
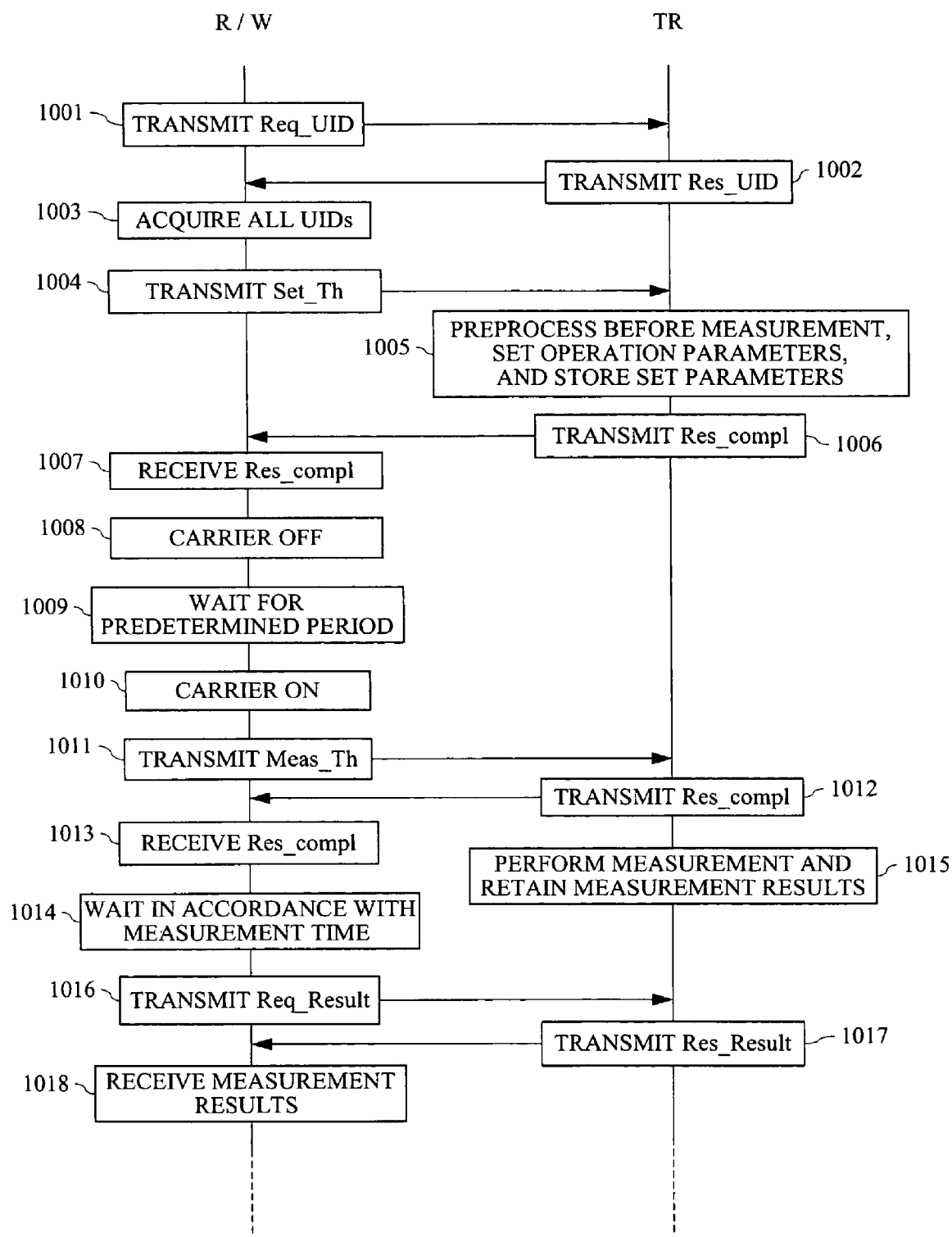
FIG. 12 is a ladder chart showing an example of a measurement operation of the reader/writer and the RFID tag in the RFID system according to the second embodiment of the present invention.
Figure 13:
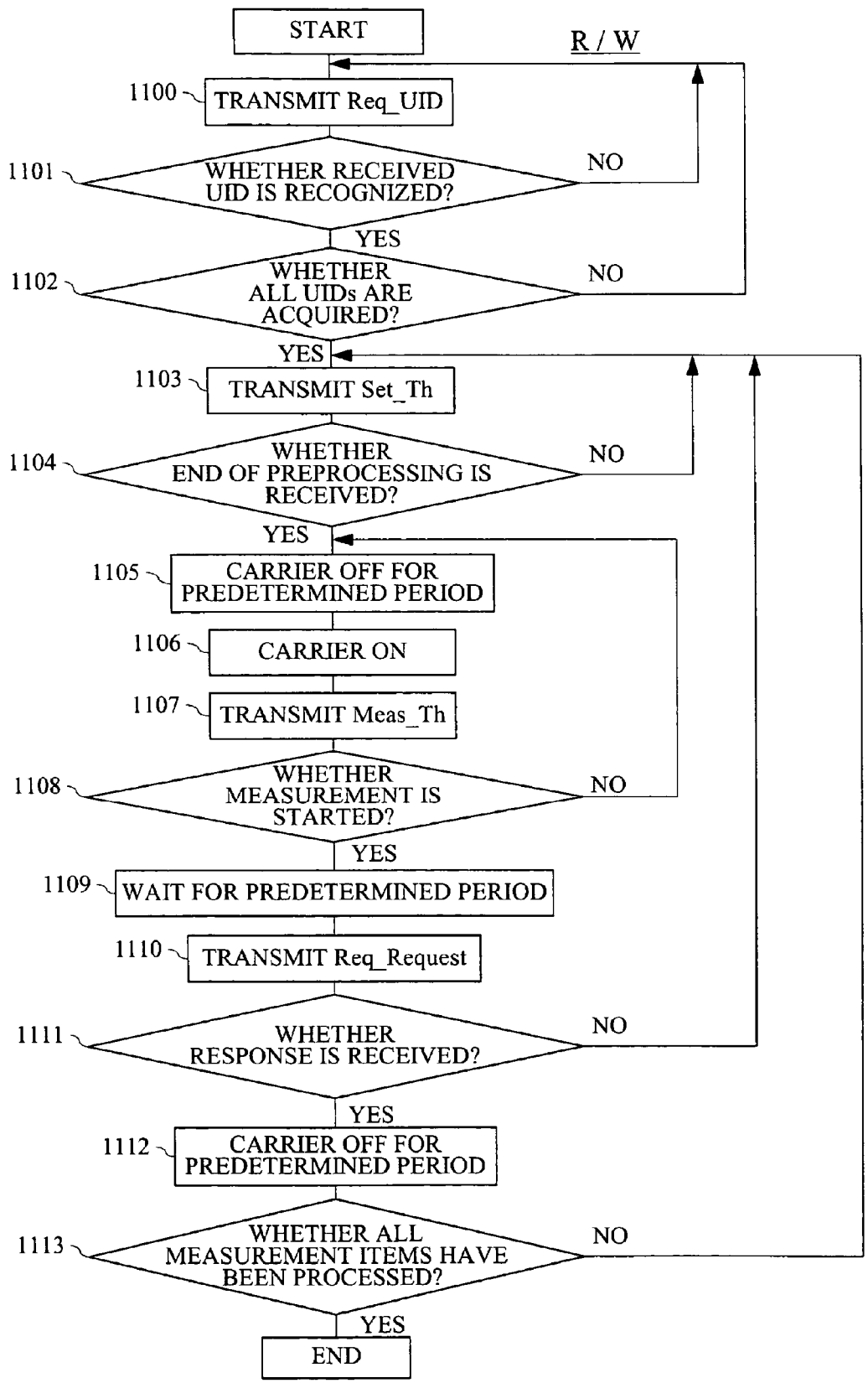
FIG. 13 is a flowchart of an example of a detailed operation of the reader/writer in the RFID system according to the second embodiment of the present invention.
Figure 14:
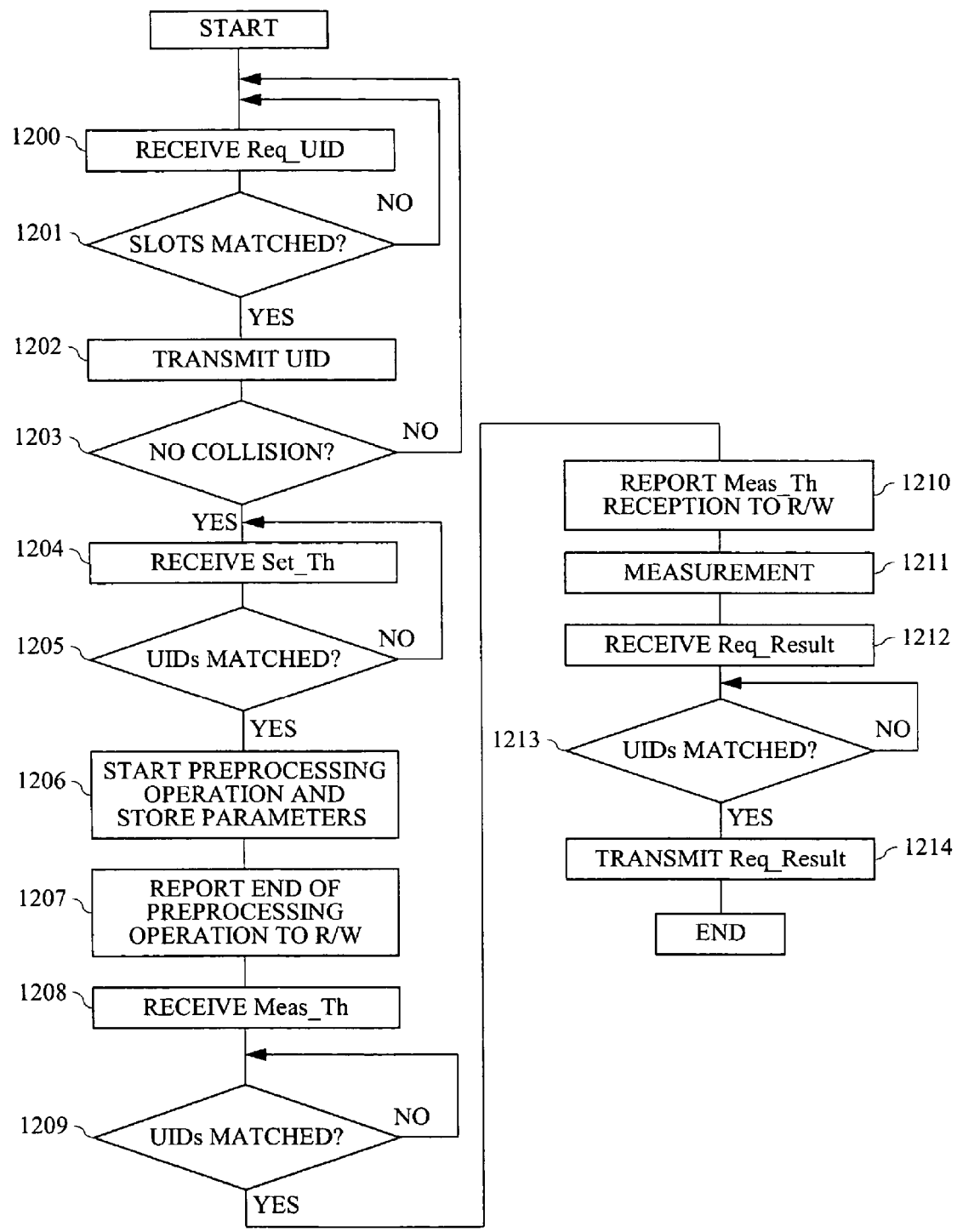
FIG. 14 is a flowchart of an example of a detailed operation of the RFID tag in the RFID system according to the second embodiment of the present invention.

Next, a detailed procedure of R/W and the RFID tag for performing the sequence as shown in FIG. 5 will be described. FIG. 12 is a ladder chart showing an example of a measurement operation of the reader/writer and the RFID tags in the RFID system according to the second embodiment of the present invention. FIG. 13 is a flowchart of an example of a detailed operation of the reader/writer. FIG. 14 is a flowchart of an example of a detailed operation of the RFID tag. The case where the sequence of FIG. 5 is used as a part of the sequence of FIG. 4 will be described here.

In steps 1001 to 1003 shown in FIG. 12, steps 1100 to 1102 shown in FIG. 13, and steps 1200 to 1203 shown in FIG. 14, transmission and reception of an identifier is performed by using the Req_UID and Res_UID commands as described with reference to FIG. 10 and FIG. 11. In steps 1001 and 1100, the reader/writer R/W transmits Req_UID to the RFID tag TR. Upon reception of Req_UID (step 1200), the RFID tag TR performs comparison with the check slot C01 in step 1201. At this time, a slot is generated from the code C02 in the RFID tag TR, and when the slot matches C01, UID is transmitted to R/W (step 1202).

Upon completion of acquiring UID, in steps 1004 to 1007 shown in FIG. 12, steps 1103 and 1104 shown in FIG. 13, and steps 1204 to 1207 shown in FIG. 14, communications for performing preprocessing such as setting of parameters required before measurement are performed between R/W and the RFID tag TR.

In steps 1004 and 1103, R/W transmits a preprocessing operation execution command (Set_Th) to the RFID tag TR. Upon reception of Set_Th in step 1204, the RFID tag TR confirms a UID match in step 1205. Then, in steps 1005 and 1206, preprocessing operation and parameter setting are performed by using C04. When the writing of set parameters in a non-volatile memory (memory circuit) MEM is completed, the RFID tag TR transmits Res_Compl to R/W as a report of completion of preprocessing (steps 1006 and 1207).

After confirming in steps 1007 and 1104 that the preprocessing operation has been completed, R/W temporarily stops the carrier in steps 1008 and 1105. Since indispensable components for measurement such as the sensor unit SENS and ADC are not operating at this time, an increase in temperature due to power consumption is small. Therefore, a time for stopping the carrier can be shorter than the stop time after the host (PC) receives the measurement data in FIG. 4.

After waiting for a predetermined period in step 1009, R/W starts to generate a carrier again in steps 1010 and 1106. Furthermore, immediately after generating a carrier, R/W transmits a measurement execution command (Meas_Th) in steps 1011 and 1107.

Upon reception of Meas_Th in step 1208, the RFID tag TR checks UID in step 1209. When the UID matching is confirmed, the RFID tag TR transmits Res_Compl to R/W in steps 1012 and 1210 to cause the sensor unit SENS, ADC, and other components to operate for performing the measurement (step 1211). However, when the measurement is completed, TR does not report completion of the measurement. A time until the measurement results are converted to digital value depends on specifications. While the measurement results are being converted to digital values, the PC and R/W are in a waiting state according to the specifications (steps 1014 and 1109). During the period when the PC and R/W are in a waiting state, the RFID tag TR performs measurement in steps 1015 and 1211 and temporarily stores data.

Note that a small amount of time is required from the reception of the measurement execution command (Meas_Th) from R/W to the start of the sensor unit SENS. Also at this time, an increase in temperature due to power consumption will occur. However, unlike the conventional technology, an increase in temperature at the stages of acquiring identifier information and preprocessing is not included, and the temperature increase in this small amount of time is insignificant compared with a time required for the processes at these stages. The measurement results are data representing a temperature at the time of measurement, and therefore measurement with an error of 0.5° C. or less can be achieved.

After waiting for a predetermined period depending on the measurement time, R/W transmits a measurement result request command (Req_Result) in steps 1016 and 1110. Upon reception of this command in step 1212, the RFID tag TR checks UID in step 1213 and then transmits the measurement results to R/W by using the measurement result return command (Res_Result) in steps 1017 and 1214.

Upon completion of the series of operations with reception of Res_Result (steps 1018 and 1111), R/W stops the carrier in step 1112. Then, if measurement is completed for all RFID tags TR in step 1113, the measurement ends. If not completed, the procedure returns to step 1100 to perform the measurement again.

As described above, in the second embodiment, by stopping the output of the carrier immediately before the start of measurement, the temperature increased due to self heating can be decreased, and thus, an influence of self heating of the RFID tag can be reduced. Therefore, in the RFID system including RFID tags each incorporating a sensor, accuracy of measurement by the sensor can be improved.

Third Embodiment

An RFID system according to a third embodiment is achieved by using a hardware structure similar to those of the above-described first and second embodiments. However, the processing sequence according to the third embodiment is different from those of the first and second embodiments.

Figure 6:
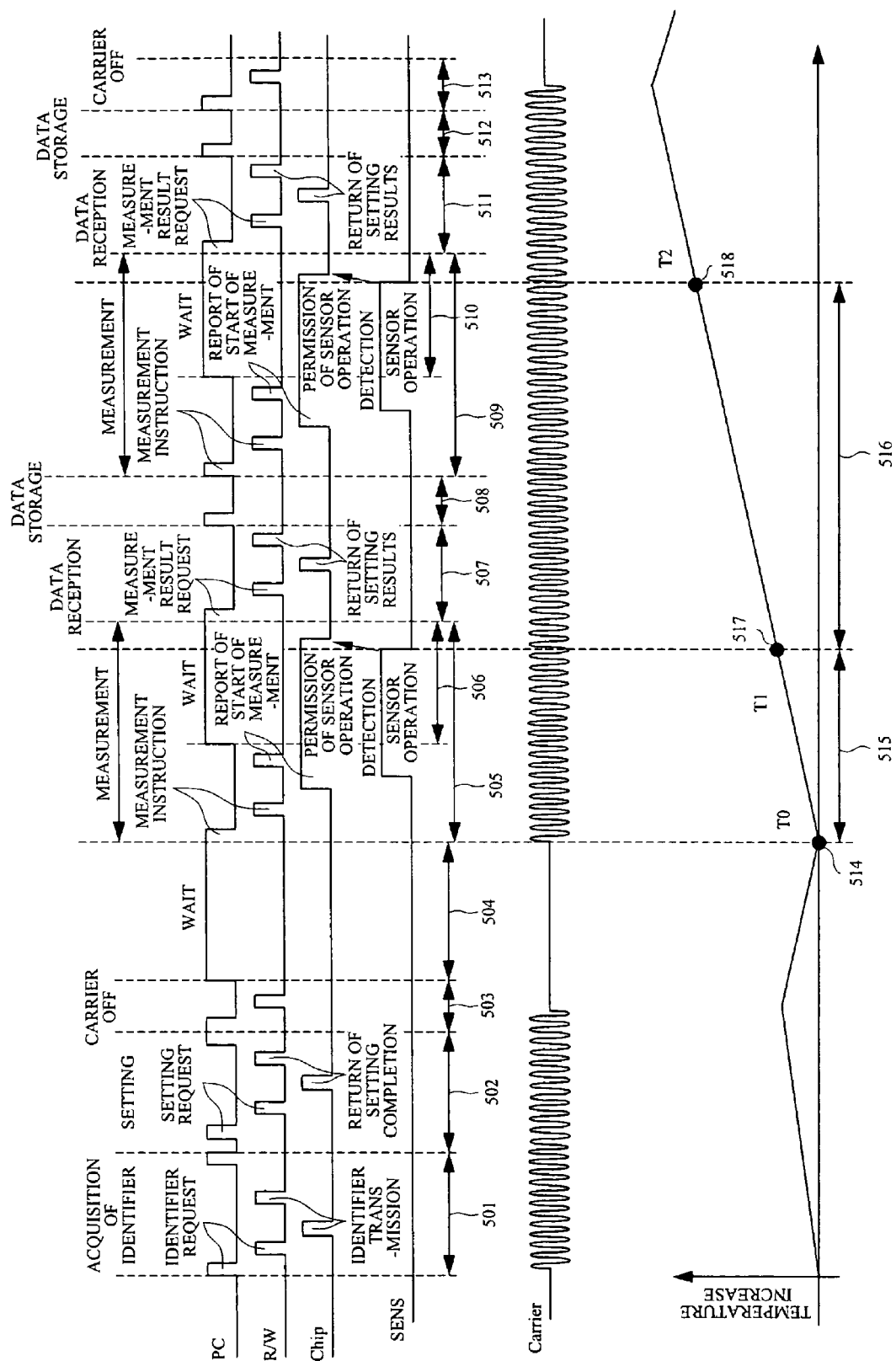
FIG. 6 is a sequence diagram of an example of a measurement procedure using the measurement system of FIG. 1 in an RFID system according to a third embodiment of the present invention.

FIG. 6 is a sequence diagram of an example of a measurement procedure using the measurement system of FIG. 1 in the RFID system according to the third embodiment of the present invention. The sequence shown in FIG. 6 is applied as a detailed sequence of each measurement in the sequence of FIG. 19 or each measurement in the sequence of FIG. 4, and it is obtained by adding steps 509 to 513 to steps 501 to 508 of the sequence shown in FIG. 5 described above. The operations in steps 509 to 512 are similar to those of steps 505 to 508 for performing measurement, transmitting the measurement results, and storing the measurement results, and step 513 corresponds to a step of carrier-off operation.

That is, the feature of the third embodiment lies in that a set of operations from performing measurement to storing the measurement results is successively performed twice between step 505 and step 512 to acquire temperature measurement data 517 and 518 from the respective sets of operations, and then, the extrapolation thereof is performed, thereby calculating a measured temperature 514 to be originally detected. More specifically, the measured temperature 514 can be calculated by performing conversion and correction by the use of, for example, a time interval (between TO and T1) and a time interval (between T1 and T2) and the temperature measurement data 517 and 518 in FIG. 6.

Figure 15:
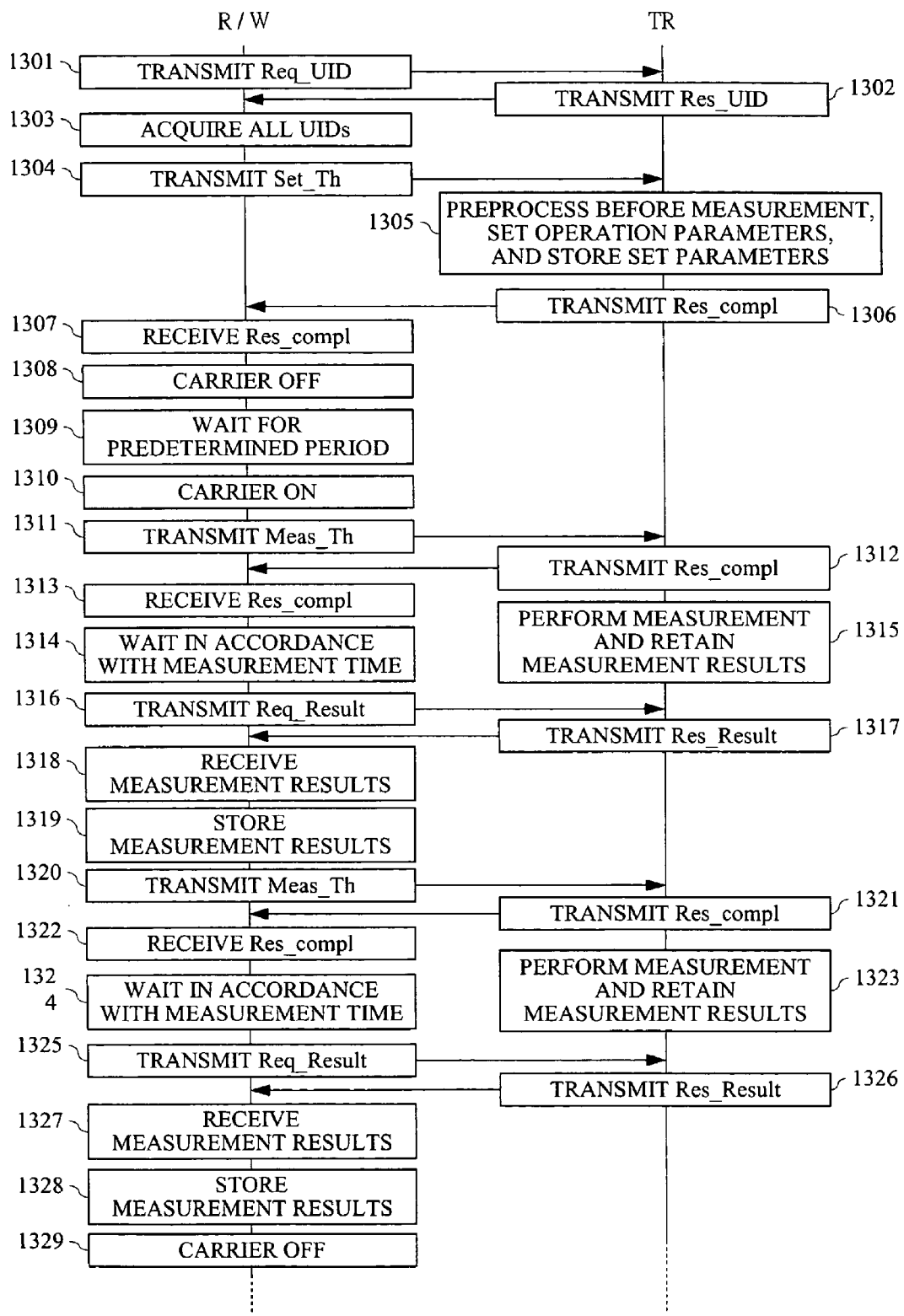
FIG. 15 is a ladder chart showing an example of a measurement operation of the reader/writer and the RFID tag in the RFID system according to the third embodiment of the present invention.
Figure 16:
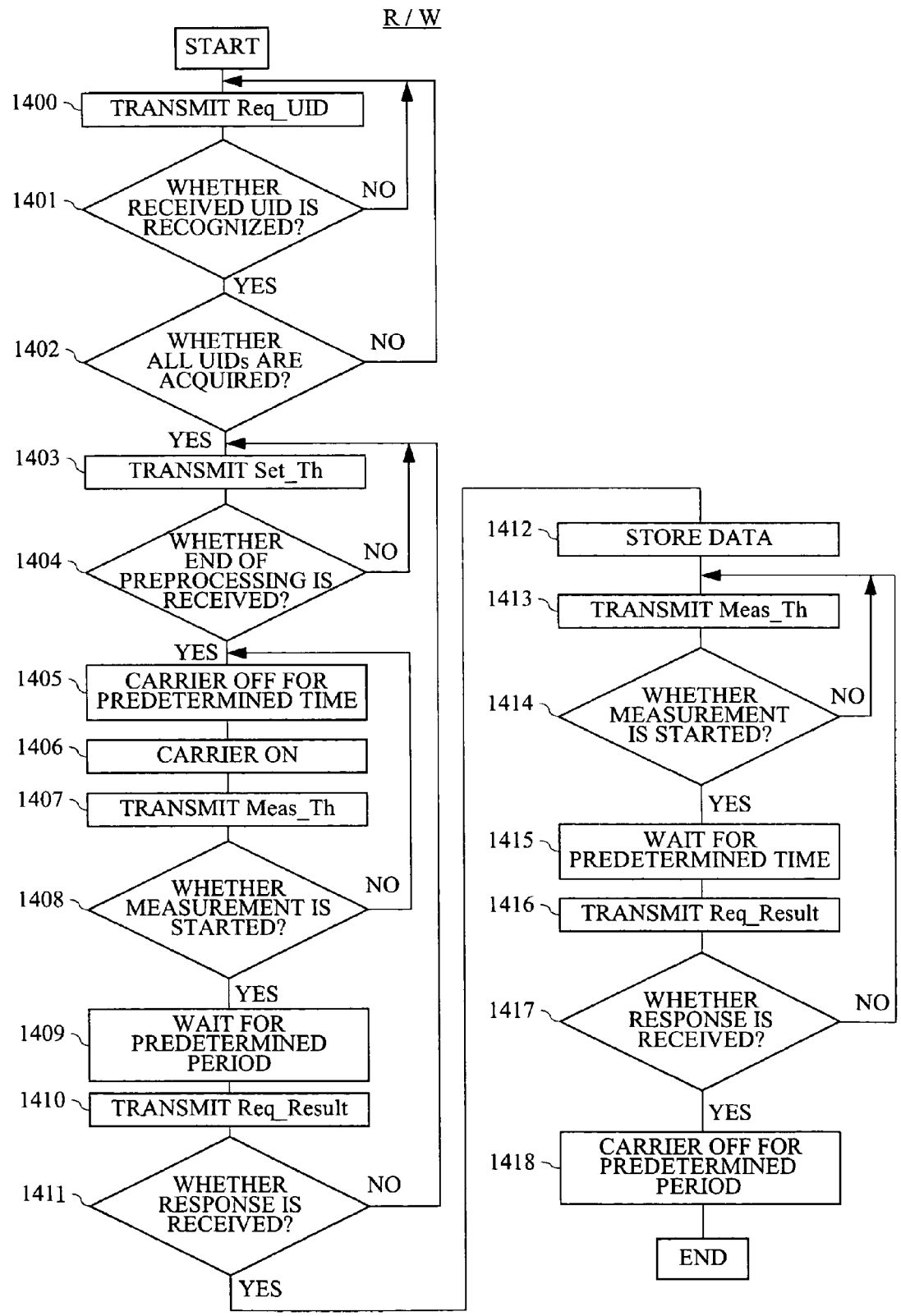
FIG. 16 is a flowchart of an example of a detailed operation of the reader/writer in the RFID system according to the third embodiment of the present invention.
Figure 17:
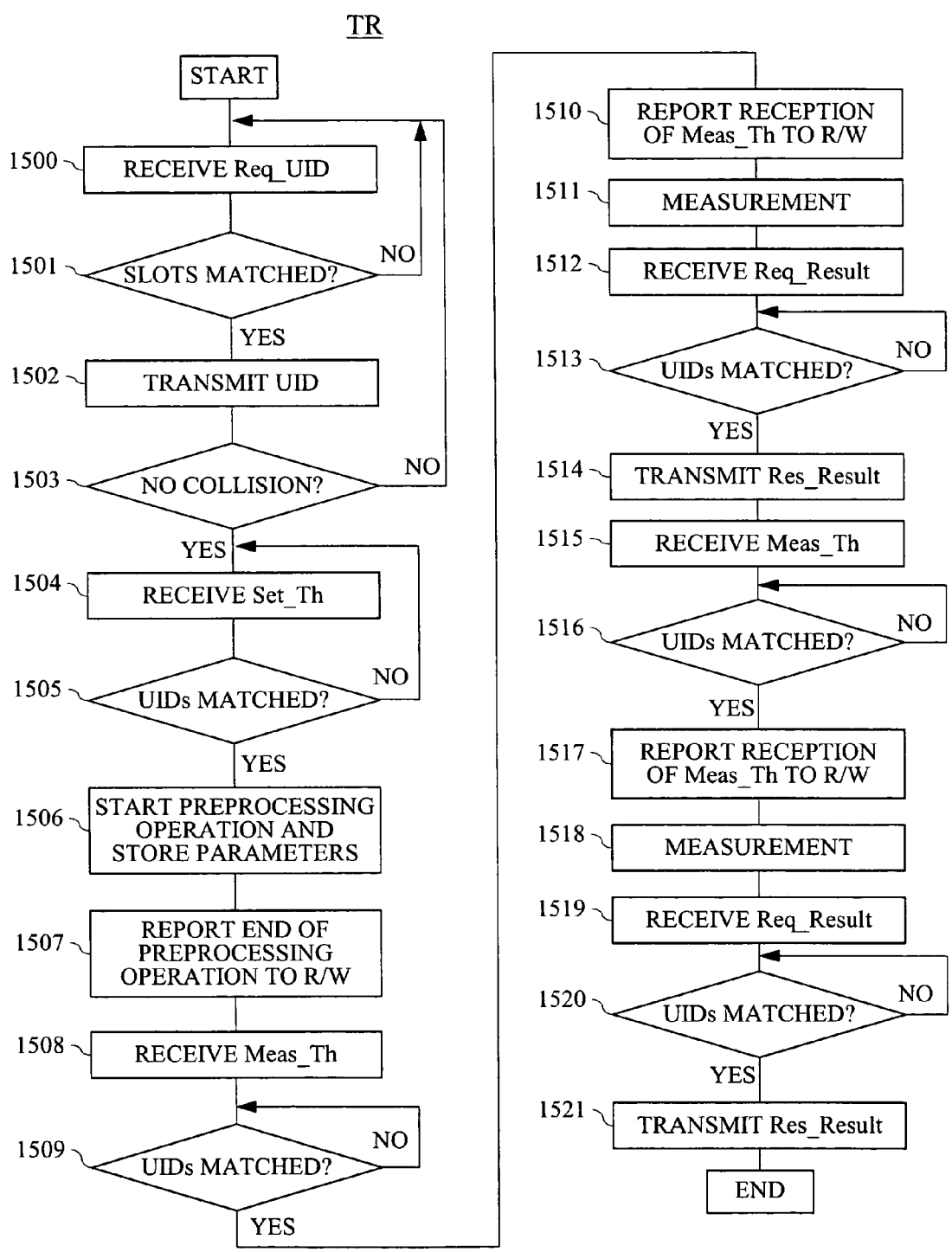
FIG. 17 is a flowchart of an example of a detailed operation of the RFID tag in the RFID system according to the third embodiment of the present invention.

Next, a detailed procedure of R/W and the RFID tag for performing the sequence as shown in FIG. 6 will be described. FIG. 15 is a ladder chart showing an example of a measurement operation of the reader/writer and the RFID tag in the RFID system according to the third embodiment of the present invention. FIG. 16 is a flowchart of an example of a detailed operation of the reader/writer. FIG. 17 is a flowchart of an example of a detailed operation of the RFID tag.

Extrapolation is performed based on measurement data and data of measurement time acquired in the steps from transmission of a measurement execution command (step 1311) to reception of the measurement results (step 1327) in FIG. 15, from transmission of a measurement execution command (step 1407) to reception of a response (step 1417) in FIG. 16, and from reception of a measurement execution command (step 1508) to transmission of the measurement results (step 1521) in FIG. 17. The detailed procedure of each step in this extrapolation is not described herein because the procedure corresponds to that obtained by repeating the process steps regarding the measurement operation and the transmission/reception of the measurement results described with reference to FIG. 12 to FIG. 14 twice.

As described above, in the third embodiment, since the extrapolation is performed, the temperature measurement particularly in consideration of self heating due to the operation of the sensor unit SENS during measurement can be executed. For this reason, an influence of self heating can be reduced. Therefore, in the RFID system including RFID tags each incorporating a sensor, accuracy of measurement by the sensor can be improved.

Fourth Embodiment

In the above-described first embodiment, as one example of a method for cutting off power supply to the RFID tag, the method of stopping the output of the carrier of R/W has been described. As another example, in a fourth embodiment, one example of the method of cutting off power supply while keeping the carrier in an ON state will be described.

Figure 9:
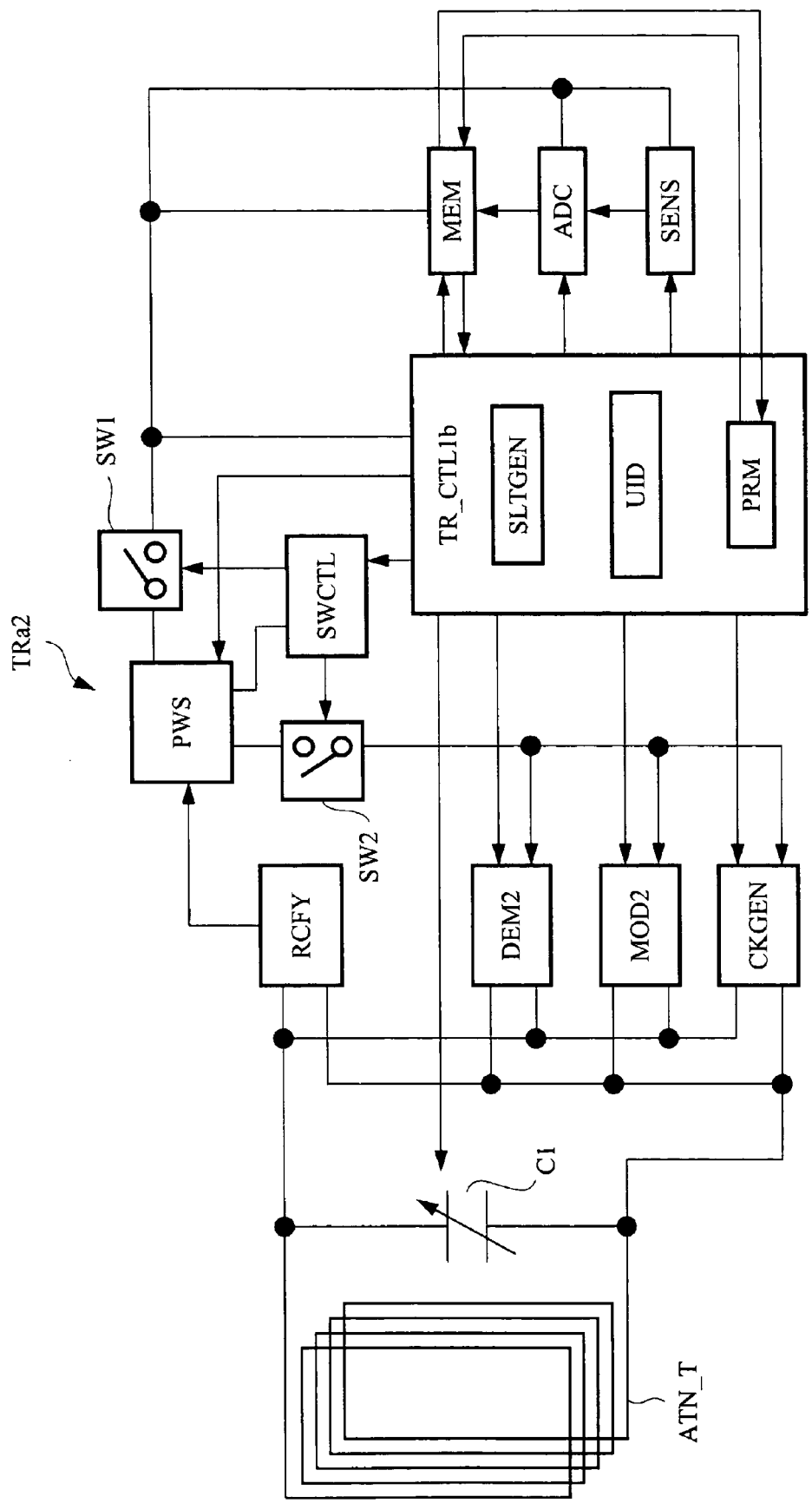
FIG. 9 is a block diagram of an example of structure of an RFID tag in the RFID system according to a fourth embodiment of the present invention.

FIG. 9 is a block diagram of an example of structure of an RFID tag in the RFID system according to the fourth embodiment of the present invention. An RFID tag TRa2 shown in FIG. 9 has a structure obtained by adding switches SW1 and SW2 functioning as power cutoff circuits, a switch control circuit SWCTL, and a variable capacitor C1 to the RFID tag TRa1 shown in FIG. 8.

The switches SW1 and SW2 have a function to control the power supply, and these switches SW1 and SW2 are controlled by SWCTL. In this method, for example, in place of stopping the carrier in steps 503 and 504 in FIG. 5 and FIG. 6 for carrier-off, the switches SW1 and SW2 are turned OFF by SWCTL. By doing so, the power supply to all circuits except SWCTL, the power generating unit PWS, and the rectifier circuit RCFY is stopped. Furthermore, when the power supplied from R/W is large, a signal for controlling the value of the variable capacitor C1 is fed from a control unit TR_CTL1$b$, which makes it possible to change the resonance frequency.

Figure 3:
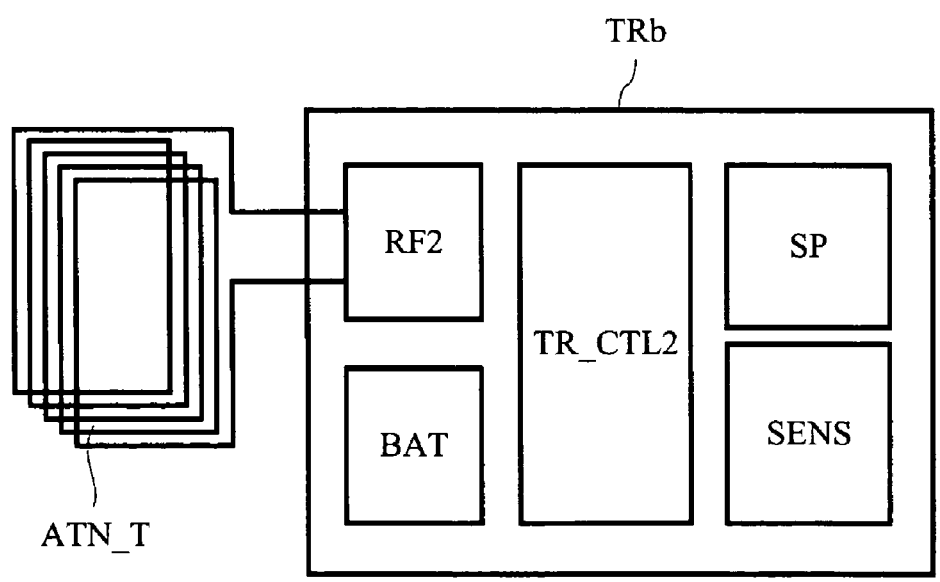
FIG. 3 is a block diagram of another example of structure of the RFID tag shown in FIG. 1.

SWCTL is provided with a timer function, and this timer makes it possible to perform the control so that power is supplied to all RFID tags in measurement step 505 in FIG. 5 and FIG. 6. The setting time of this timer can be determined in step 502 of FIG. 5 and FIG. 6 for setting parameters. This method can be applied not only to steps 503 and 504 of FIG. 5 and FIG. 6 but also to steps 402 and 404 of FIG. 4, for example. Furthermore, this method can be applied not only to a passive RFID tag but also to an active RFID tag as shown in FIG. 3 to suppress an increase in temperature of the RFID tag.

Note that various types of method of cutting off power supply to the RFID tag are known other than the method described above. In one method, for example, a plurality of power supply regulator circuits are provided and some of them are made inactive. Also, a system of a signal for switching cutoff and resumption of power supply is not limited to the timer as described above, but may be a system of generating a cutoff signal and resumption signal from R/W. As described above, by cutting off power supply by the circuit of the RFID tag itself, accuracy of measurement by the sensor can be improved.

In the foregoing, the invention made by the inventors of the present invention has been concretely described based on the embodiments. However, it is needless to say that the present invention is not limited to the foregoing embodiments and various modifications and alterations can be made within the scope of the present invention. For example, the present invention can be applied to temperature measurement in sterilizing process of a drink by short-time heating. In the case of application to the sterilizing process of milk or the like, when an RFID tag incorporating a temperature sensor is used to perform a sterilizing process by heating for several seconds, a temperature error due to self heating of the RFID tag can be reduced. Therefore, accurate temperature measurement in heat processing can be achieved.

Also, in the above-described embodiments, only the case of a temperature sensor has been described. However, the present invention is not restricted to a measurement system using a temperature sensor but is also effective in a measurement system using a sensor whose characteristics are changed depending on temperature. For example, in the case of an optical detection sensor using a photodiode described in Japanese Patent Laid-open Publication No. 2005-077210, the value of the dark current is changed depending on temperature, which affects the sensitivity. If the present invention is applied to such a case, changes in dark current due to an increase in temperature can be reduced, and it is possible to suppress an influence on sensitivity.

In the case where measurements are successively performed several times for performing the extrapolation, the number of times of measurement is two in the above embodiments, but the number of times is not restricted to two. However, since an increase in temperature due to power consumption is limited for each chip, the number of times of measurement is preferably restricted to an extent where the temperature is approximately linearly increased as shown in FIG. 4.

The RFID system according to the present invention is a technology effectively applied to a measurement system including RFID tags each incorporating a temperature sensor, and it can be widely applied to other measurement systems including RFID tags each incorporating various sensors such as an optical detection sensor.

What is claimed is:

1. An RFID system comprising:
   RFID tags each having a communication circuit, a control circuit, and a sensor circuit, integrated on one semiconductor chip; and
   an RFID reader/writer for wireless communication with said RFID tags by generating a carrier wave,
   wherein said RFID reader/writer includes a function to cut off power supply to the internal circuits of said RFID tags by stopping generation of said carrier wave for a first predetermined period between confirmation of an ID of said RFID tags and a beginning of a measurement operation by using said sensor circuit,
   the measurement operation includes successive measurements, and
   the RFID reader/writer has a function to stop the generation of said carrier wave for a second predetermined period between each of the successive measurements,
   wherein each measurement operation includes a first processing step of performing various processes before execution of a measurement and a second processing step of performing the measurement by using said sensor circuit, and then processing results of said measurement,
   said predetermined period in which power supply is cut off is a period between an end of said second processing step and a start of said first processing step, and
   wherein each measurement operation includes a first processing step of performing various processes before execution of a measurement and a second processing step of performing the measurement by using said sensor circuit, and then processing results of said measurement,
   said predetermined period in which power supply is cut off is a period between an end of said first processing step and a start of said second processing step, and
   wherein said function to cut off power supply is achieved by cutting off a carrier signal directed from said RFID reader/writer to said RFID tags,
   wherein each of said RFID tags having a power supply cutoff circuit for controlling cutoff/resumption of power supply to the internal circuits of said RFID tags, and
   wherein each measurement operation includes a first processing step of performing various processes before execution of a measurement and a second processing step of performing measurements several times by using said sensor circuit, and then processing results of said measurements,
   said predetermined period in which power supply is cut off is at least one of a period between an end of said first processing step and a start of said second processing step, and a period between an end of said second processing step and a start of said first processing step, and
   said RFID system includes a function to correct an error due to self heating of said RFID tag based on the measurement results obtained through measurements performed several times in said second processing step, and then calculate one measurement result for said second processing step.

2. An RFID system comprising:
   RFID tags each having a communication circuit, a control circuit, and a sensor circuit, integrated on one semiconductor chip; and
   an RFID reader/writer for wireless communication with said RFID tags by generating a carrier wave,
   wherein said RFID reader/writer includes a function to cut off power supply to the internal circuits of said RFID tags by stopping generation of said carrier wave for a first predetermined period between confirmation of an ID of said RFID tags and a beginning of a measurement operation by using said sensor circuit,
   wherein said function to cut off power supply is achieved by cutting off a carrier signal directed from said RFID reader/writer to said RFID tags,
   wherein each of said RFID tags having a power supply cutoff circuit for controlling cutoff/resumption of power supply to the internal circuits of said RFID tags, and
   wherein each measurement operation includes a first processing step of performing various processes before execution of a measurement and a second processing step of performing measurements several times by using said sensor circuit, and then processing results of said measurements,
   said predetermined period in which power supply is cut off is at least one of a period between an end of said first processing step and a start of said second processing step, and a period between an end of said second processing step and a start of said first processing step, and
   said RFID system includes a function to correct an error due to self heating of said RFID tag based on the measurement results obtained through measurements performed several times in said second processing step, and then calculate one measurement result for said second processing step.

* * * * *